United States Patent Office 3,610,094
Patented Oct. 5, 1971

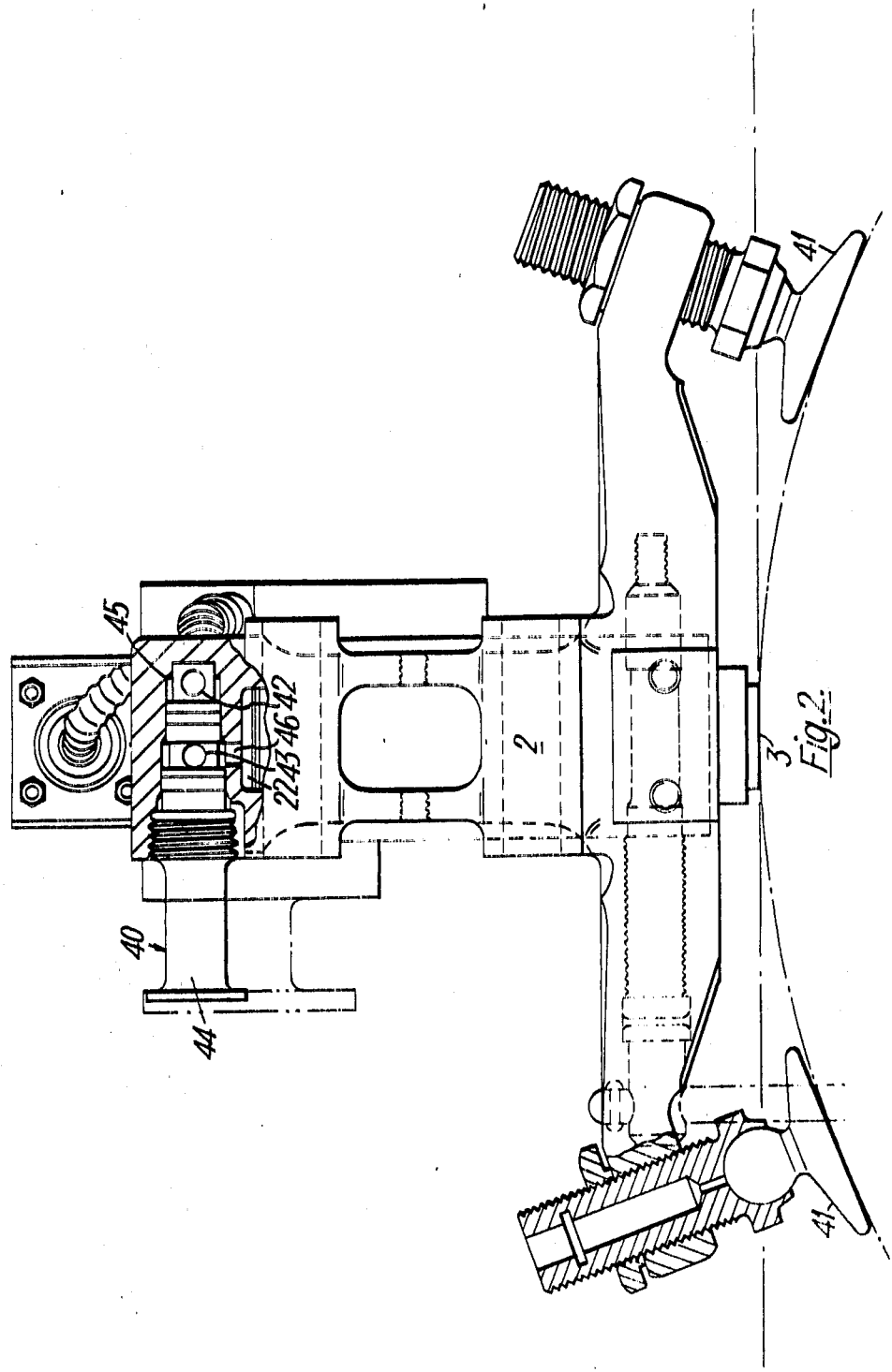

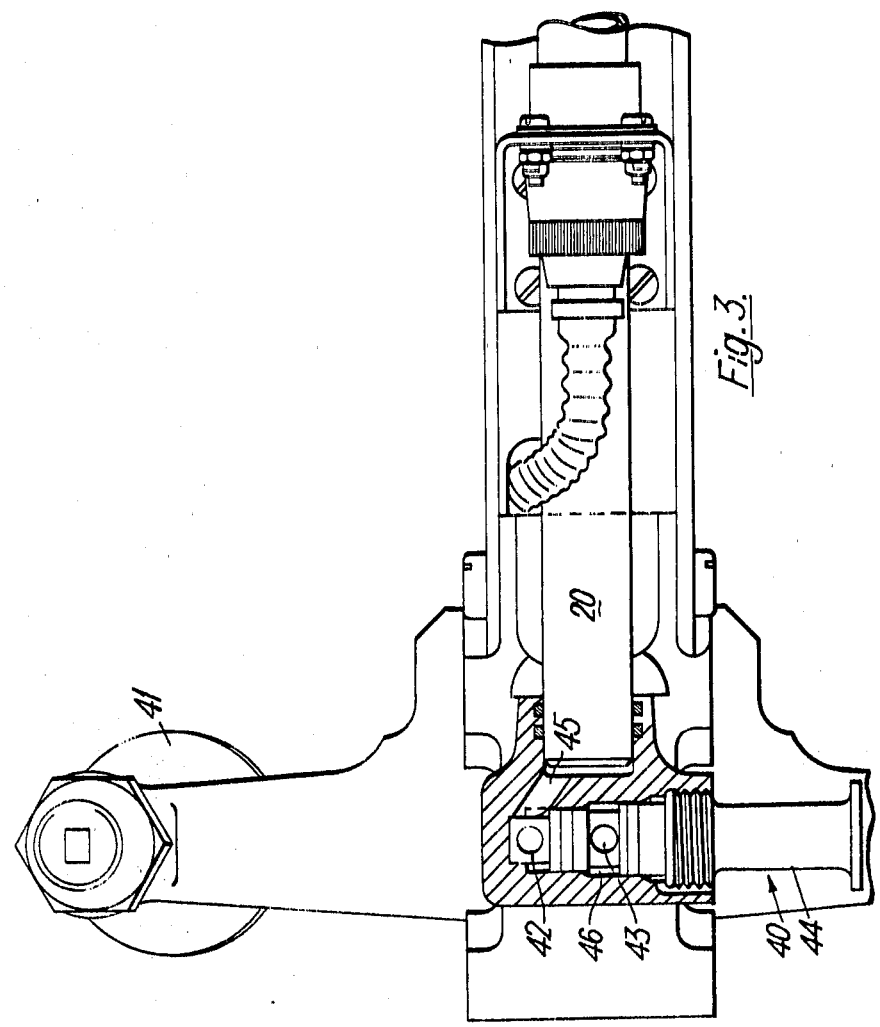

3,610,094
EJECTOR RELEASE UNITS FOR USE IN AIRCRAFT
Samuel W. Craigie, Maidenhead, England, assignor to M. L. Aviation Company Limited, Slough, England
Filed Apr. 21, 1969, Ser. No. 817,750
Claims priority, application Great Britain, Aug. 8, 1968, 38,014/68
Int. Cl. B64d 1/04
U.S. Cl. 89—1.5 F
3 Claims

ABSTRACT OF THE DISCLOSURE

An ejector release unit for releasing and projecting a heavy object, for example a bomb, from an aircraft includes a releasable latching mechanism for supporting the object, a pair of telescopic ejection guns for projecting the object from the aircraft, a holder for one or more cartridges, and means for conducting high pressure gas produced on ignition by the cartridges to the latching mechanism and to the ejection guns. Thus cartridge ignition causes the object to be released and projected away from the aircraft. The projection force is controlled by one or two interchangeable throttles located in the gas conducting means. The or each throttle vents a proportion of the gas to atmosphere unlike conventional throttles. In consequence very small thrusts can be obtained from the ejection guns.

---

This invention relates to ejection guns, otherwise known as ejector release units, for releasing and projecting bombs and similar heavy objects from aircraft. It is particularly concerned with the same general kind of ejector release unit that is described in my British patent specification No. 1,058,997, that is to say a unit comprising a releasable latching mechanism for supporting the object, a pair of telescopic ejection guns for projecting the object from the aircraft, and a holder for one or more cartridges which, on ignition produce pressure gas which causes the latching mechanism to release the object and also power the ejection guns which therefore project the object away from the aircraft. The optimum projection force or thrust depends on the prevailing circumstances and it is accordingly normal practice to provide for adjustment of the rate at which the gas is admitted to the barrels of the guns so as to permit control of this force. For instance, as described in the above patent specification, a shut-off member or throttle is located in the path of the gas flowing to each barrel and serves to restrict the gas flow. Throttles permitting greater or smaller gas flow rates are substituted as required. For example, an object may have an offset centre of gravity in which case throttles productive of different thrusts from the two guns may be used so as to neutralise the effect of this. Alternatively, it may be necessary to give the object a pitching moment.

If only a very small thrust is required, the gas flow rate to the barrel must be correspondingly low. In consequence the cross-sectional area of the gas passage defined by the throttle must be very small. It is found, however, that the solid combustion products or other particles in the gas tend to block small passages. The rate at which this occurs naturally increases as the cross-sectional area of the passages is reduced. Very small passages become blocked at once and hence cannot be used at all. Slightly larger passages may not become blocked until the ejector release unit has been used several times but in this case, to guard against premature blockage, the passage must be cleaned or the throttle replaced each time the unit is used. In any case, as just indicated, even this does not permit the use of very small passages and hence the conventional ejector release unit cannot produce less than a certain thrust. This is a major disadvantage since there are many situations where a very small thrust is required.

According to the present invention the interchangeable throttle located in the patch of the gas flowing to at least one of the guns has a gas inlet, a gas outlet for gas passing to the gun, and a second gas outlet for venting a proportion of the gas to the atmosphere. Accordingly, the gas entering the throttle is divided into two streams, one of which passes into the barrel of the gun to provide the thrust and the other of which is vented to the atmosphere. The result is that a throttle of this construction designed to produce the same gas pressure in the barrel as a conventional throttle has passages connecting the inlet and outlets having a greater cross-sectional area than those in the conventional throttle. It is found in practice that these passages may be so proportioned that blockages may be avoided. It can be seen from this that such throttles therefore enable the ejector release unit to produce a much lower thrust than is possible using conventional throttles. In fact, throttles of this construction can be designed to produce virtually zero thrust. It will be appreciated that as the size of the passage leading to the venting outlet is increased in relation to the size of the barrel outlet, so the proportion of gas flowing into the barrel is reduced. At the lower limit, the passage leading to the venting outlet is so large that the pressure in the barrel does not rise at all on operation so the ejection force is zero, in other words a free drop results.

By way of example an ejector release unit in accordance with the invention will now be described in more detail with reference to the accompanying drawings in which:

FIG. 2 is an end elevation of the unit partly in section looking in the direction of the arrow A in FIG. 1;

FIG. 3 is a plan view of the left-hand part of the unit partly in section as shown in FIG. 1;

FIG. 4 is a plan view partly in section of one of the two throttles incorporated in the unit; and FIG. 5 is a side elevation of the throttle.

Figure 1:
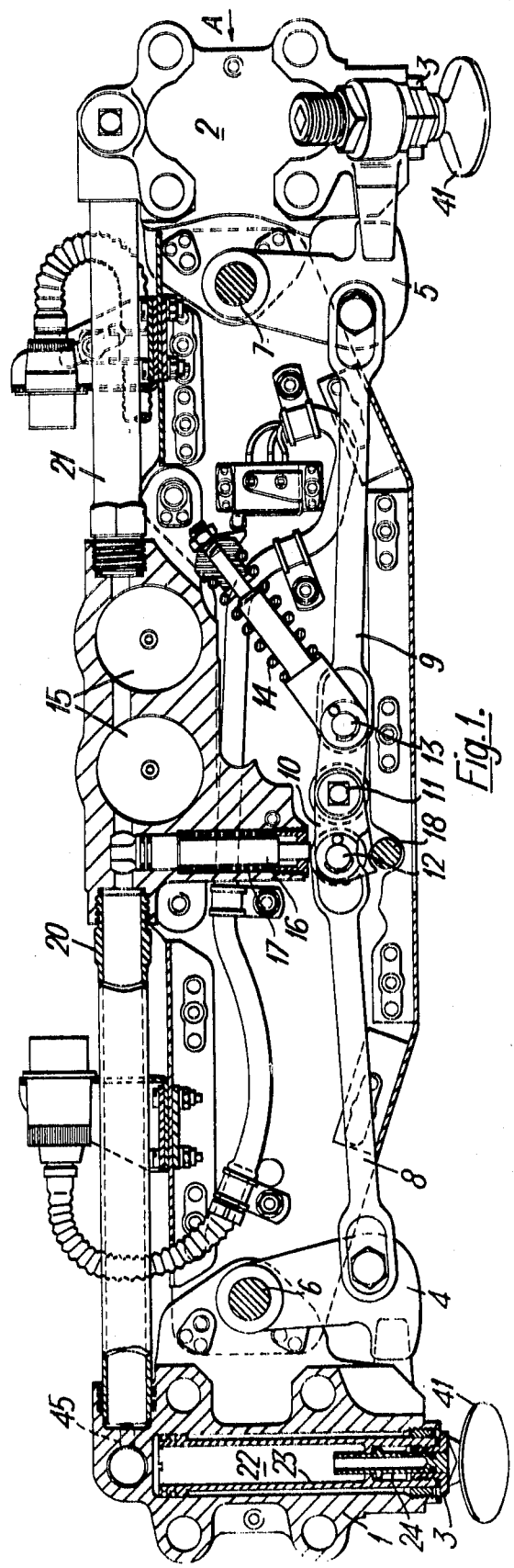
FIG. 1 is a side elevation of the unit partly in section.

Reference should be made first to FIG. 1 from which it can be seen that the unit includes a pair of ejection guns 1 and 2, the former of which is shown in section. Each gun has a piston indicated generally at 3 which acts against the upper surface of an object carried by the unit. The object is held in this position by a pair of latch members 4 and 5 pivoted about respective horizontal axes at 6 and 7 and normally engaging under respective parts of the object. In operation the guns 1 and 2 are fired simultaneously and the latch members 4 and 5 are moved towards one another simultaneously so as to release the object which is then ejected downwardly by the combined downward thrust of the guns 1 and 2.

The two latch members 4 and 5 are controlled by a toggle linkage to which they are connected by rods 8 and 9. The toggle linkage consists of a lever 10 pivoted at 11 about a horizontal axis and pivotally connected to the two rods 8 and 9 at 12 and 13 respectively. A compression spring 14 acts between the point 13 and the framework of the unit and retains the linkage in the position shown. The unit includes two chambers 15 for identical electrically ignited cartridges. When these cartridges are ignited, the resulting pressure gas flows into a cylinder within a piston 16 and forces the piston downwardly against the bias of a compression spring 17. The piston 16 contacts the point 12 of the toggle linkage and if a safety-pin 18 has been withdrawn, it pushes the linkage over-centre. Once this has occured, the weight of the object carried by the unit moves the latch members 4 and 5 and the rods 8 and 9 towards one another thus releasing itself. As this occurs, the point 13 moves over-centre whereupon the compression spring 14 retains the linkage in the new position.

At the same time, the pressure gas passes from the cartridges along respective tubes 20 and 21 to the two guns 1 and 2. Since both guns are identical, only the gun 1 will be described. As can be seen from FIG. 1, it includes a barrel 22 defined by a sliding cylinder 23 which acts in the manner of a piston. A secondary cylinder 24 is slidably mounted in the cylinder 23 and carries the piston 3 at its lower end. Pressure gas which has entered the barrel 22, in a manner which is described later, forces the cylinder 23 downwardly and when this has reached the end of its stroke, it forces the cylinder 24 downwardly. When the latter reaches its lower position, an aperture in its lower wall clears the end of the cylinder 23 so that the gas in the barrel can exhaust to the atmosphere. It will be understood that the downward movement of these two cylinders acts on the object and thrusts it away from the unit.

The gas passes from the tubing 20 to the barrel 22 through the previously explained throttle which is indicated at 40 in FIGS. 2, 3, 4 and 5. An identical throttle is provided for the gun 2. Reference to FIG. 4 also shows how the object carried by the unit is securely held against the underside of the latter, screw-mounted pads 41 being arranged to securely hold the object against the latch members 4 and 5.

The throttle indicated at 40 is generally tubular in cross-section and has a radially extending inlet 42 having a diameter of 0.093 inch, an outlet 43 to the barrel having a diameter of 0.125 inch, and an outlet 44 to atmosphere. Reference to FIGS. 2 and 3 shows that gas passes from the tubing 20 through a passage 45 to the inlet 42. The gas then flows axially along a part 47 of the bore of the throttle. This part 47 has a diameter of 0.043 inch. A proportion of the gas leaves the throttle through the outlet 43 and then passes through a passage 46 into the barrel 22. The remainder passes axially along a part 48 of the bore of the throttle and out of the outlet 44 to atmosphere. The part 48 also has a diameter of 0.043 inch. Accordingly, only a proportion of the gas pressure in the tubing 20 is applied to the barrel 22. With standard cartridges, the illustrated throttle produces a thrust on the piston 3 of 1500 lb. A throttle of the same dimensions but without the outlet 44 produces a thrust of 8000 lb.

The throttle includes a tubular insert 49 of molybdenum defining the parts 47 and 48 of the bore to minimise erosion by the very hot gas. It should be appreciated that the gas flows through the throttle at near sonic velocity for a very short time of the order of 50 milliseconds.

As can be seen, the throttle can be easily withdrawn from the unit for replacement by one having passages of different dimensions. It will be appreciated that throttles having two outlets, that is as illustrated, are only used where low thrusts are required. Conventional throttles are used where higher thrusts are required.

I claim:
1. An ejector release unit for releasing and projecting a heavy object from an aircraft, comprising a releasable latching mechanism for supporting said object, a pair of telescopic ejection guns for projecting said object from the aircraft, holder means for at least one pressure-gas-producing cartridge, means for conducting said pressure gas to said latching mechanism and to said ejection guns whereby said pressure gas causes said latching mechanism to release said object and also causes said ejection guns to project said object away from said aircraft, and located in said gas conducting means an interchangeable throttle having a gas inlet, an unrestricted gas outlet for gas passing to one of said ejection guns, and a second unrestricted gas outlet having a cross-sectional area smaller than that of said first unrestricted gas outlet for venting a proportion of said gas to atmosphere.

2. An ejector release unit according to claim 1 wherein said interchangeable throttle has an insert of molybdenum arranged to protect said throttle from damage by said gas.

3. For use in an ejector release unit for releasing and projecting a heavy object from an aircraft and comprising a releasable latching mechanism for supporting said object, a pair of telescopic ejection guns for projecting said object from the aircraft, holder means for at least one pressure-gas-producing cartridge, and means for conducting said pressure gas to said latching mechanism and to said ejection guns whereby said pressure gas causes said latching mechanism to release said object and also causes said ejection guns to project said object away from said aircraft, the improvement which comprises an interchangeable throttle for location in said gas conducting means and comprising a generally tubular body having a gas inlet at one end, an unrestricted gas outlet to atmosphere at the other end, a bore lined with a gas resistant material and connecting said gas inlet and said gas outlet, and a second unrestricted gas outlet having a cross-sectional area larger than that of said first unrestricted gas outlet and extending transversely to and intercepting said bore, said second gas outlet providing gas communication to one of said ejection guns.

References Cited

UNITED STATES PATENTS

| | | | |
|---|---|---|---|
| 2,822,207 | 2/1958 | Steinmetz et al. | 89—1.5 (F) X |
| 2,856,224 | 10/1958 | Kelly et al. | 89—1.5 (F) X |
| 2,937,899 | 5/1960 | Murphy | 244—137 X |
| 3,056,623 | 10/1962 | Herbert | 89—1.5 (F) X |

SAMUEL W. ENGLE, Primary Examiner

U.S. Cl. X.R.

244—137 R; 294—83 AE